United States Patent [19]

McCarroll

[11] 3,757,663
[45] Sept. 11, 1973

[54] WINDOW VENT

[76] Inventor: Raymond A. McCarroll, 1725 Newcastle, Grosse Pointe Woods, Mich.

[22] Filed: Mar. 24, 1972

[21] Appl. No.: 237,645

[52] U.S. Cl. .................................. 98/2.12, 98/27
[51] Int. Cl. ....................... B60r 27/00, B60h 1/24
[58] Field of Search .............................. 98/27, 2.12

[56] References Cited
UNITED STATES PATENTS

| | | | |
|---|---|---|---|
| 1,917,093 | 7/1933 | Cameron | 98/2.12 |
| 3,090,292 | 5/1963 | Berliner | 98/2.12 |

Primary Examiner—William E. Wayner
Attorney—Olsen & Stephenson

[57] ABSTRACT

Vent apparatus that is mounted on a vehicle door and extends outboard of the door glass at the forward edge of the window opening. The apparatus includes a die cast ornamental strip that is fitted over and secured to the door frame that extends the length of the front edge of the window. An L-shaped die cast channel member supports a transparent plate and the upright leg of the channel member is hingedly connected to the strip adjacent to the upper and lower ends thereof. An adjustable torque device is incorporated in the hinge connection to retain the transparent plate at a desired angular relation with respect to the door glass.

11 Claims, 7 Drawing Figures

Patented Sept. 11, 1973 3,757,663
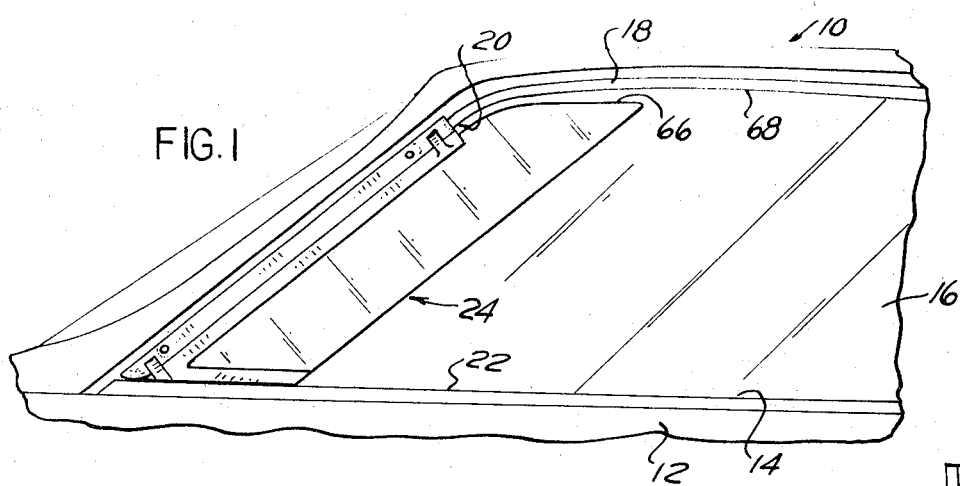
FIG. 1
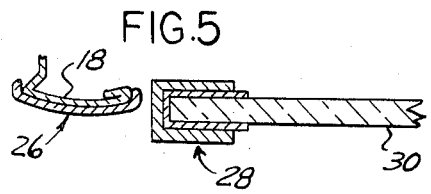
FIG. 5
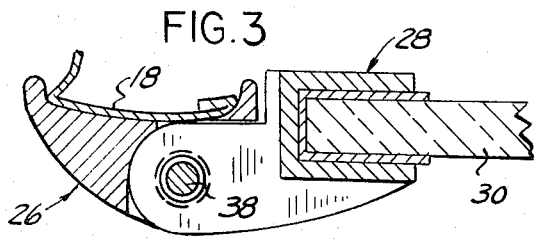
FIG. 3
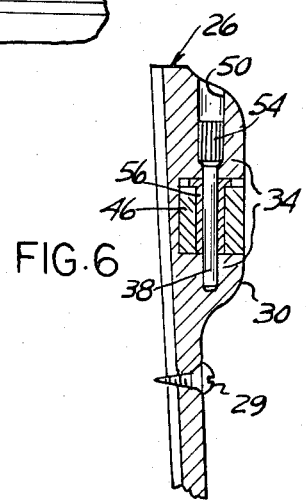
FIG. 6
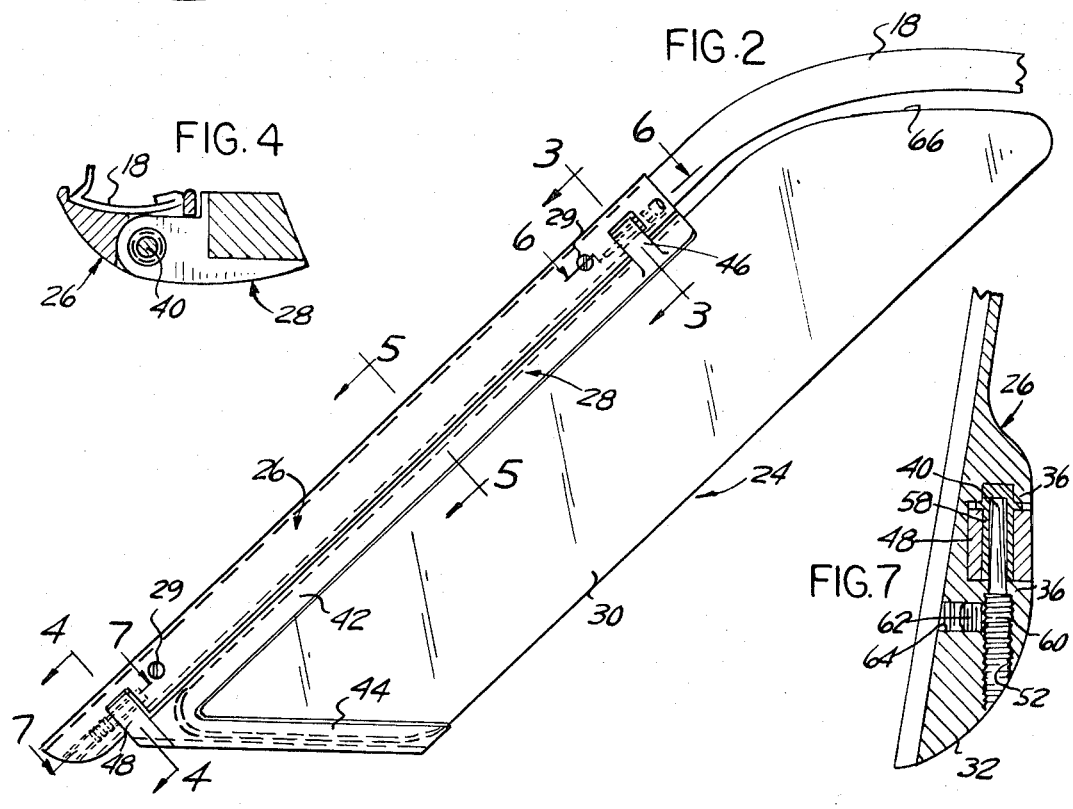
FIG. 4
FIG. 2
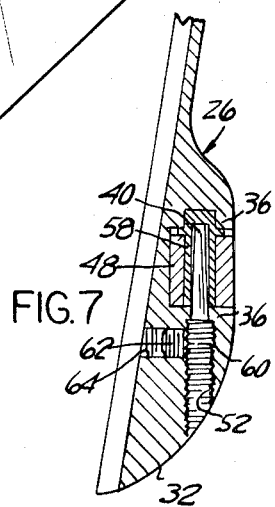
FIG. 7

WINDOW VENT

BACKGROUND OF THE INVENTION

The present invention relates to ventilation apparatus for mounting on the door of an automobile adjacent to the forward edge of the window opening.

Many of the automobiles being manufactured today have a single, full window glass for the front door which provides certain advantages, such as from cost and styling purposes, for example. If the automobile is equipped with an air conditioner there may be little need for opening the window, at least partially, for ventilation purposes. However, without an air conditioner or under other circumstances when the driver or other occupants in the automobile desire to have air ventilation from the front door window, the absence of suitable vent windows in the doors when the full windows are open creates problems for the occupants both from the standpoint of insects, dust, dirt, noise and undesirable drafts or air currents.

Separate vent window attachments for automobiles have been known in the past, but they create problems in styling, construction and costs, and because of difficulties that arise in attaching them to existing automobiles.

SUMMARY OF THE INVENTION

The present invention is directed to vent window apparatus for an automobile which is constructed and arranged to be used on automobiles having full window glass in the front doors, and which can be added on a new automobile or which can be sold to the aftermarket distributors for mounting on automobiles previously sold.

According to a preferred form of the present invention vent apparatus is provided for use in an automobile having a door with a window opening and a window frame portion located around edges of the opening on the outer side of the door, and wherein the forward and lower edges of the opening define an acute angle. The vent apparatus comprises a unitary support strip contoured to fit the exterior surface of the window frame portion substantially the full length of the forward edge and secured thereto, and L-shaped channel member having an upright leg and a base leg that have an included angle substantially equal to said acute angle, and a transparent plate retained in said channel member. The plate has an upper edge contoured to the shape of the corresponding edge of the opening. The upright leg has hinge elements adjacent to the hinge elements of the upright leg, and pins are provided therein for retaining said hinge elements in hingedly connected relation. Adjustable torque means are associated with one of the hinge connections for retaining the transparent plate at a selected angular displacement with respect to the door. Preferably, the unitary support strip and the L-shaped channel members are members formed from zinc die castings, but other metals such as aluminum may also be used. In addition, formed steel channels and plastic materials may also be used.

Thus, it is an object of the present invention to provide an improved vent window apparatus for automobiles, particularly automobiles of the type having a full window glass in the front door.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a fragmentary side elevation of an automobile with a vent apparatus embodying one form of the present invention;

FIG. 2 is an enlarged side elevation of the vent apparatus mounted on a door frame of the automobile;

FIG. 3 is an enlarged section taken on the lines 3—3 of FIG. 2;

FIG. 4 is an enlarged section taken on the lines 4—4 of FIG. 2;

FIG. 5 is an enlarged section taken on the lines 5—5 of FIG. 2;

FIG. 6 is an enlarged section taken on the lines 6—6 of FIG. 2; and

FIG. 7 is another enlarged section taken on the lines 7—7 of FIG. 2.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description an not of limitation.

Referring now to the drawings, the invention will be described in greater detail. The automobile 10 has a front door 12 which includes a window opening 14 in which is mounted a full window glass 16. The door has a window frame portion 18 which in the illustrated embodiment is a trim molding which is located around the edges of the opening 14 on the outer side of the door. The forward edge 20 and the lower edge 22 of the opening 14 define between them an acute angle in the conventional manner.

The vent apparatus 24 comprises a unitary support strip 26, an L-shaped channel member 28, a transparent plate 30, and suitable hinge and adjustable torque means to be described. The unitary support strip 26 is contoured to fit the exterior surface of the window frame portion or trim molding 18 substantially the full length of the forward edge of the opening, and it is secured to the trim molding 18 by a plurality of screws 29. The support strip 26 is preferably manufactured by a die casting operation and is made to have bulbous formations 30 and 32 at upper and lower ends thereof as can be seen best in FIGS. 6 and 7. The bulbous formations 30 and 32 are formed to provide the hinge elements 34 and 36 in which hinge pins 38 and 40 can be inserted.

The L-shaped channel member 28 has an upright leg 42 and a base leg 44 which have an included angle which is substantially the same as the acute angle between the forward and lower edges 20 and 22 of the window opening 14. The L-shaped channel member 28 is preferably formed by a die casting operation and includes the hinge elements 46 and 48 which are located in the upright leg 42. The hinge elements 46 and 48 cooperate with the corresponding hinge elements 34 and 36 to provide a hinged connection between the unitary support strip 26 and the L-shaped channel member 28.

For the purpose of assembling the hinged parts together, the bulbous projections 30 and 32 are provided with holes 50 and 52 into which the pins 38 and 40 can be introduced from the upper and lower ends of the unitary support strip 26. The pin 38 is provided with serrations at 54 and the pin 38 is press-fitted into the hole 50. A bushing 56 will normally be used in the hole in the hinge element 46 for receiving the stem of the pin 38.

The hinge connection at the lower ends of the support strip 26 and L-shaped channel member 28 is constructed and arranged so as to provide an adjustable torque means for frictionally securing the L-shaped channel member 28 and its transparent plate 30 at a selected angular displacement with respect to the door glass 16. For this purpose the bushing 58 which is located in the hinge element 38 is tapered, and the mating portion of the pin 40 is also tapered. The lower end of the pin 40 is threaded, as at 60, whereby when the pin 40 is screwed into the threaded hole 52, wedging action will require a torque to be applied to the L-shaped channel member 28 and its plate 30 to pivot these components relative to the unitary support strip 26. The magnitude of the torque will be directly depended upon the extent that the pin 40 is screwed into the tapered bushing 58. Once the proper setting has been made of the pin 40, a set screw 62 can be inserted and screwed into place in the opening 64 to lock the pin 40 in its set position.

The transparent plate 30 preferably will be made from tempered glass which is mounted and sealed within the channel member 28, but other suitable transparent materials, such as clear plastic materials, may also be used for this purpose. It is also to be observed that the transparent plate 30 has an upper edge 68 which is contoured to the shape of the edge of the opening at the intersection between the forward and upper edges 20 and 68 of the window opening 14.

From the foregoing description it will be understood that a vent apparatus 24 has been provided which is closely contoured to fit the shape of the forward end of the window opening 14 and which has components which can be mounted easily in place either on new or used automobiles. The vent apparatus is constructed and arranged so that it is compatible with the styling of the automobile and can be fabricated at relatively low cost.

It is claimed:

1. In an automobile having a door with a window opening, vent apparatus mounted on said door on the forward edges of the opening comprising a unitary support strip contoured to fit the exterior surface of said door substantially the full length of the forward edge of the window opening and secured thereto, a channel member hingedly connected to said support strip adjacent to the upper and lower ends of the strip, a transparent plate retained in the channel member, and an adjustable torque means associated with one of the hinge connections between said support strip and said channel member for retaining said transparent plate at a selected angular displacement with respect to said door.

2. The combination that is defined in claim 1, wherein said channel member is L-shaped.

3. The combination that is defined in claim 2, wherein the included angle between the forward and lower edge of said opening is an acute angle, and the upright leg and base leg of said L-shaped channel member have an included angle substantially equal to said acute angle.

4. The combination that is defined in claim 3, wherein said transparent plate has an upper edge contoured to the shape of the edge of said opening at the intersection between the forward and upper edges.

5. In an automobile having a door with a window opening and a trim molding located around the edges of the opening on the outer side of the door, vent apparatus mounted on said trim molding on the forward edge of the opening comprising a unitary support strip contoured to fit the exterior surface of said trim molding substantially the full length of the forward edge and secured thereto, a channel member hingedly connected to said support strip adjacent to the upper and lower ends of the strip, a transparent plate retained in the channel member, said channel member having hinge elements adjacent to its upper and lower ends and said strip having hinge elements receiving the hinge elements of the channel member, and pins retain said hinge elements in their hingedly connected positions.

6. The combination that is defined in claim 5, wherein said unitary support strip and said channel member are die cast elements.

7. The combination that is defined in claim 6, wherein said unitary support strip has bulbous projections which define its hinge elements, and said pins are fitted in place in said bulbous projections through axially aligned holes extending from the upper and lower ends of said support strip.

8. In an automobile having a door with a window opening and a trim molding located around the edges of the opening on the outer side of the door, vent apparatus mounted on said trim molding on the forward edge of the opening comprising a unitary support strip contoured to fit the exterior surface of said trim molding substantially the full length of the forward edge and secured thereto, a channel member hingedly connected to said support strip adjacent to the upper and lower ends of the strip, a transparent plate retained in the channel member, and an adjustable torque means associated with one of the hinge connections between said support strip and said channel member for retaining said transparent plate at a selected angular displacement with respect to said door.

9. The combination that is defined in claim 8, wherein said one hinge connection comprises hinge elements in said channel member and said strip that are joined by a pin, and said adjustable torque means is provided by said pin being threadedly connected to one of said elements and having a tapered extension extending into the other element, said other element containing a tapered bore for receiving said tapered extension, and said one element having a set screw for engaging said pin to secure the pin in place after the pin has been advanced sufficiently far into said tapered bore to require a torque of desired magnitude to angularly displace said L-shaped channel member.

10. In an automobile having a door with a window opening and a window frame portion located around edges of the opening on the outer side of the door, the forward and lower edges of the opening defining an acute angle, vent apparatus for said opening comprising a unitary support strip contoured to fit the exterior surface of said window frame portion substantially the full length of the forward edge and secured thereto, an L-shaped channel member having an upright leg and a base leg that have included angle substantially equal to said acute angle, and a transparent plate retained in said channel member, said plate having an upper edge contoured to the shape of the corresponding edge of said opening, said upright leg having hinge elements adjacent to its upper and lower ends, said unitary support strip having hinge elements adjacent to the hinge elements of said upright leg, pins retaining said hinge elements in hingedly connected relation, and adjustable torque means associated with one of the hinge connections for retaining said transparent plate at a selected angular displacement with respect to said door.

11. The combination that is defined in claim 10, wherein said unitary support strip and said L-shaped channel member are each one-piece die cast members.

* * * * *